US009845611B2

(12) United States Patent
Koerner (10) Patent No.: US 9,845,611 B2
(45) Date of Patent: Dec. 19, 2017

(54) DEVICE FOR SECURING TEMPORARY STRUCTURES (71) Applicant: Robert H. Koerner, Coal City, IL (US)

(72) Inventor: Robert H. Koerner, Coal City, IL (US)

( * ) Notice: Subject to any disclaimer, the term of this patent is extended or adjusted under 35 U.S.C. 154(b) by 0 days.

(21) Appl. No.: 15/170,057

(22) Filed: Jun. 1, 2016

(65) Prior Publication Data
US 2017/0101799 A1 Apr. 13, 2017

Related U.S. Application Data (63) Continuation-in-part of application No. 14/877,010, filed on Oct. 7, 2015.

(51) Int. Cl.
| A47B 97/00 | (2006.01) |
| E04H 12/22 | (2006.01) |
| E04H 15/62 | (2006.01) |
| E01F 9/692 | (2016.01) |
| E01F 9/673 | (2016.01) |
| A01G 9/04 | (2006.01) |

(52) U.S. Cl.
CPC .......... *E04H 12/2246* (2013.01); *A01G 9/04* (2013.01); *E01F 9/673* (2016.02); *E01F 9/692* (2016.02); *E04H 12/2269* (2013.01); *E04H 15/62* (2013.01)

(58) Field of Classification Search
CPC . A01G 9/04; A01G 27/02; A01G 9/02; H01L 28/91; H01L 28/55
USPC ....... 248/500, 502, 504, 505, 507, 508, 910, 248/680; 135/114, 117, 118, 120.1
See application file for complete search history.

(56) References Cited

U.S. PATENT DOCUMENTS

| 3,626,871 | A | * | 12/1971 | McClendon | ........... A47B 13/06 108/103 |
| 5,020,764 | A | * | 6/1991 | Yamamoto | .......... E04H 12/2246 248/529 |
| 5,862,633 | A | * | 1/1999 | Van Ells | ................... E03B 3/02 135/117 |
| 6,536,733 | B1 | * | 3/2003 | Sharp | ..................... A45B 11/00 248/519 |
| 6,539,665 | B1 | * | 4/2003 | Llona | ....................... A01G 9/02 206/423 |
| 6,789,916 | B2 | * | 9/2004 | Ruggles | .................... A01G 9/02 248/156 |
| 7,721,748 | B2 | * | 5/2010 | Dreamwalker | ......... E04H 15/60 135/114 |
| 7,722,000 | B2 | * | 5/2010 | Sherburne | ................ A01G 9/02 211/85.23 |
| 7,958,670 | B2 | * | 6/2011 | Kamau | .................... A01G 9/02 47/66.1 |
| 8,312,888 | B2 | * | 11/2012 | Rees, Jr. | ................. E04H 6/025 135/117 |

(Continued)

*Primary Examiner* — Kimberly Wood
(74) *Attorney, Agent, or Firm* — Carlos R. Villamar; The Villamar Firm PLLC (57) ABSTRACT A device and method for securing a structural object, including a bottom tray configured to support thereon a container having an open top portion and a closed bottom portion, the bottom tray having a vertical wall configured to support the container around a circumference thereof; and a slot integrated into an end of the bottom tray and vertical wall and configured to fit around a pole shaped structural object adapted to be received within the slot, the bottom tray of the slot configured to rest upon a base of the pole shaped structural object.

4 Claims, 7 Drawing Sheets (56) References Cited

U.S. PATENT DOCUMENTS

| | | | | |
|---|---|---|---|---|
| 8,371,321 B2* | 2/2013 | Affolter | ................... | B63B 17/02 |
| | | | | 135/116 |
| 8,424,549 B1* | 4/2013 | Goldsmith | ............... | E04H 15/60 |
| | | | | 135/116 |
| 8,439,058 B2* | 5/2013 | Doell | ................... | E04H 12/2246 |
| | | | | 135/118 |
| 8,714,174 B1* | 5/2014 | DeSousa | ............. | E04H 12/2246 |
| | | | | 135/117 |
| 8,770,213 B2* | 7/2014 | Downey | ................. | E04H 15/58 |
| | | | | 135/120.1 |
| 8,789,549 B1* | 7/2014 | Barnes | .................... | E04H 15/62 |
| | | | | 135/114 |
| 8,851,095 B2* | 10/2014 | LeAnna | .................... | A45B 3/00 |
| | | | | 135/120.1 |
| 9,404,282 B2* | 8/2016 | Andrews | ................. | E04H 15/62 |
| 2009/0100789 A1* | 4/2009 | Hornbeak | ........... | E04H 12/2238 |
| | | | | 52/745.19 |
| 2011/0000132 A1* | 1/2011 | Kamau | .................... | A01G 9/02 |
| | | | | 47/66.6 |
| 2012/0017960 A1* | 1/2012 | Doell | ................. | E04H 12/2246 |
| | | | | 135/120.1 |
| 2015/0322690 A1* | 11/2015 | Andrews | ................. | E04H 15/62 |
| | | | | 135/120.1 |

* cited by examiner

DEVICE FOR SECURING TEMPORARY STRUCTURES

CROSS REFERENCE TO RELATED DOCUMENTS

The present invention claims benefit of priority to co-pending, U.S. patent application Ser. No. 14/877,010 of Robert H. KOERNER, entitled "DEVICE FOR SECURING TEMPORARY STRUCTURES," filed on Oct. 7, 2015, the entire disclosure of which is hereby incorporated by reference herein.

BACKGROUND OF THE INVENTION

Field of the Invention

The present invention generally relates to devices for securing structures, and more particularly to a device for securing temporary structures, such as open tents, shade structures, signs, and the like.

Discussion of the Background

In recent years, temporary structures have been developed, such as open tents, shade structures, signs, and the like. However, such structures can be light and difficult to maintain in place, due to winds, movement, and the like. Therefore, there is a need a device for securing temporary structures, such as open tents, shade structures, signs, and the like.

SUMMARY OF THE INVENTION

The above and other problems are addressed by exemplary embodiments of the present invention, which advantageously provide a device adapted to fit around legs of temporary structures, such as open tents, shade structures, signs, and the like, to secure such structures in place.

Accordingly, aspects of the present invention relate to a device and method for securing a structural object, including a bottom tray configured to support thereon a container having an open top portion and a closed bottom portion, the bottom tray having a vertical wall configured to support the container around a circumference thereof; and a slot integrated into an end of the bottom tray and vertical wall and configured to fit around a pole shaped structural object adapted to be received within the slot, the bottom tray of the slot configured to rest upon a base of the pole shaped structural object.

The bottom tray is cylindrical or rectangular shaped.

The slot is rectangular, circular or wedge shaped.

The structural object includes a leg of a shade structure, tent or sign.

Still other aspects, features, and advantages of the present invention are readily apparent from the following detailed description, simply by illustrating a number of illustrative embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings and in which like reference numerals refer to similar elements and in which.

DETAILED DESCRIPTION OF THE INVENTION

The present invention includes recognition that numerous structures have been manufactured so as to provide a fast and convenient method of erecting a collapsible framework having extendable legs to support the spreading structural pieces. Such devices are commonly known as shade tent, shade structures, and the like. Such devices may have sides with screens and/or solid wind covers, and typically include an attachable fabric covering on the upper frame to provide sunshade or rain cover, and the like. Such devices are designed to be temporary structures, which are easily collapsed and can transported and stored until their next use. However, such structure have an inherent problem in that they can react to various elements of nature, including movement from wind, other objects, and the like.

For example, due to the nature of an object of the size and portability of such a shade tent, structure, and the like, such structures require some means of support, as they can easily displaced and moved by wind, and the like. In not very extreme circumstances, such structures can be easily lifted and tossed about, creating hazards to life, property, and the like. To counteract such possibilities, the manufacturers of such structures recommend against erecting such structures during inclement weather, existing or predicted. In any case, they may advise securing such structures with stakes, and the like, which can be very time consuming and fail to provide sufficient anchoring support, and the like.

In view of the above and other discovered problems, the present invention provides a means for adding a mass weight to the legs of such temporary structures so as to enable such structures to resist mechanical forces induced by the wind, and the like, and that is simple to employ, and can be easily manufactured using techniques to manufacture commonly produced objects, such as plastic injection molded, buckets, barrels, and the like.

Figure 1:
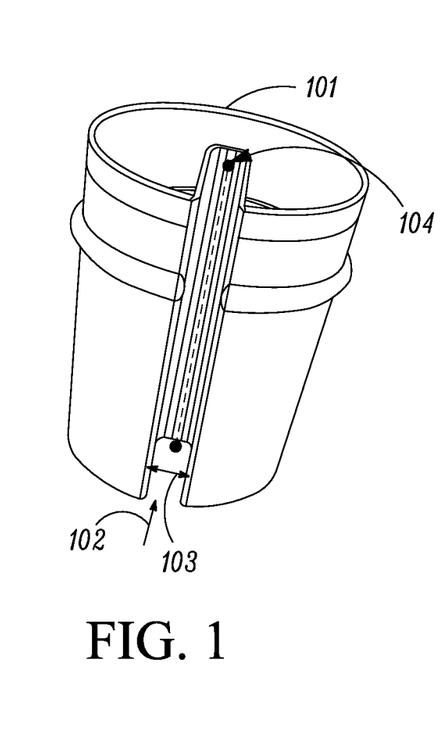
FIG. 1 illustrates a device adapted to fit around legs of temporary structures to secure such structures in place.

FIG. 1 illustrates a device adapted to fit around legs of temporary structures to secure such structures in place. In FIG. 1, the device 101 provides a simple and succinctly novel method of adding mass to legs of a structure. The device 101 can be configured in the shape of a slotted bucket, barrel, and the like, so that it can be easily manufactured (e.g., made of plastic using plastic injection molding or 3D printing techniques), and can be easily transported and stored (e.g., based on stackable, and nesting type design), and the like.

Accordingly, the device 101 can be manufactured as a bucket, barrel, a container, and the like (e.g., cylindrical shaped, rectangular shaped, etc.), and with a slot, indent, and the like, 102 of predetermined shape (e.g., triangular, rounded, rectangular, etc.), width, and length, integrated through a full height of the device 101 configured a vessel that can hold, water, sand, and the like, to add mass to the device 101. As shown in FIG. 1, the indented slot 102 can be configured to extend to a central radius point 104 in the device 101 plus of a distance of about half a predetermined indent width 103 so as to center a structural element 309 shown in FIG. 3 (e.g., a leg of an open tent, shade structure, signs, etc.) in the slot 102. Advantageously, such design, as described, allows the structural element 309, sized just under the width of 103, and of any suitable shape, to be positioned and inserted along the slot 103 and up to the center radius point 104.

In addition, when the device 101 is in position, the mass of the device and its contents (e.g., water, sand, etc.) can be equally distributed around the circumference of the structural element 309. Accordingly, the device 101 can accept liquid, solid, and the like, materials that can also be granular or cast in place as a solid (e.g., cement) for permanent mass addition. The device 101 functions as a container, and as such can effectively hold smaller groupings of weighted objects, and the like, in a confined space to increase mass (e.g., adding 8 five pound bags of sand produces a total device 101 weight when the device 101 is around the size of a 5 gallon bucket, thus exceeding 40 pounds, adding 5 sealed bags of water can produce a weight exceeding 40 pounds of mass, etc.).

Figure 2:
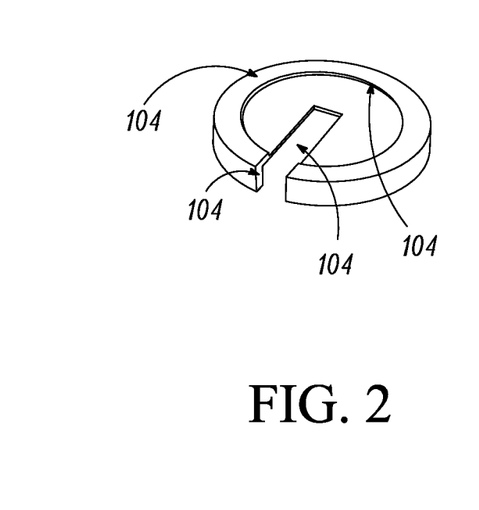
FIG. 2 illustrates an integral lid used of the device of FIG. 1.

FIG. 2 illustrates an integral lid 205 for the device 101 of FIG. 1. In FIG. 2, the lid 205 can be manufactured (e.g., made of plastic using plastic injection molding or 3D printing techniques) with an indented slot 207 that mirrors the slot 102 of the device 101 of FIG. 1. The lid 205 can be centered over the device 101 via an extension of a lip 208 adapted to fit the outside circumference of the device 101. Advantageously, the lid 205 can be revolved to any suitable point thus closing off the top opening of the indented slot 102 of the device 101, to lock in, to some degree, the structural element 309, and so as to also provide resistance to lateral movement to some degree. The top of the lid 205 has a manufactured lid top indentation 206 that accepts the bottom circumference of the device 101, providing nesting, stackability, and the like.

Figure 3:
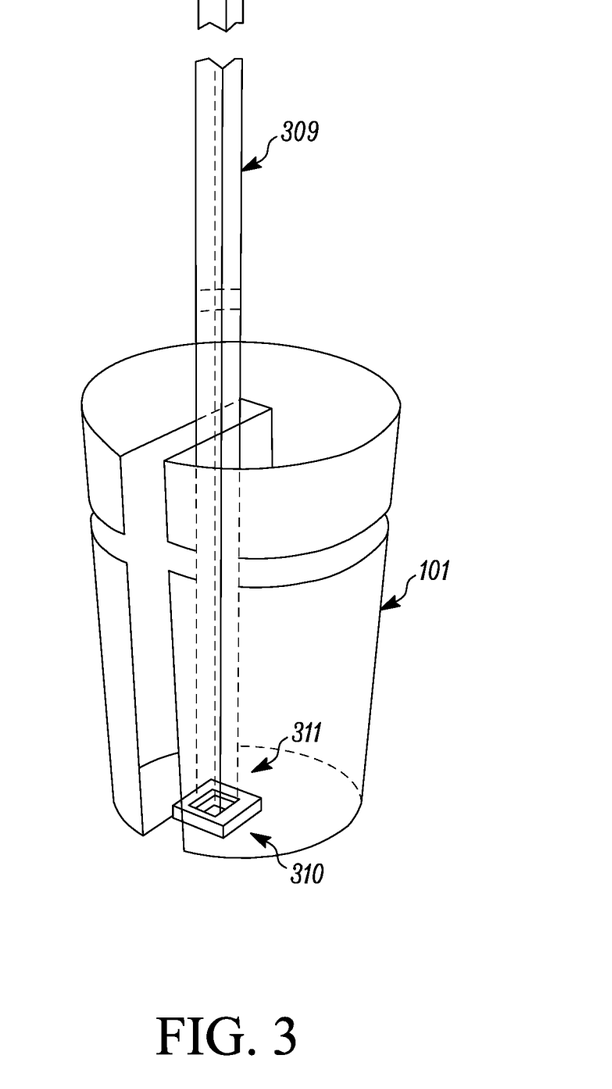
FIG. 3 illustrates a location of a structural element secured by the device of FIG. 1.

FIG. 3 illustrates a location of a structural element secured by the device of FIG. 1. In FIG. 3, the structural element 309 (e.g., a leg of an open tent, shade structure, signs, etc.) can be placed within the indented slot 102 of the device 101 at the center of radius point 104. The structural element 309 can typically include an attached flange 310. The indented slot 102 is configured to be smaller than the flange 310 so that the flange 310 cannot to pass through the indented slot 102. The mass of the device 101 and contents thereof are therefore equally distributed at 311 on the flange 310 for advantageously securing the structural element 309 by gravitational force and which that does not employ a fixed mechanical connection between the device 101 and the structural element 309, and achieved by positioning of the device 101 without a need for critical measurements, and the like. The use of the device 101 in the described manner, advantageously, negates a need for additional securing devices, such as straps, ropes, and the like, that can fail at any time and for varied reasons, such as broken connections, and the like.

Figure 4:
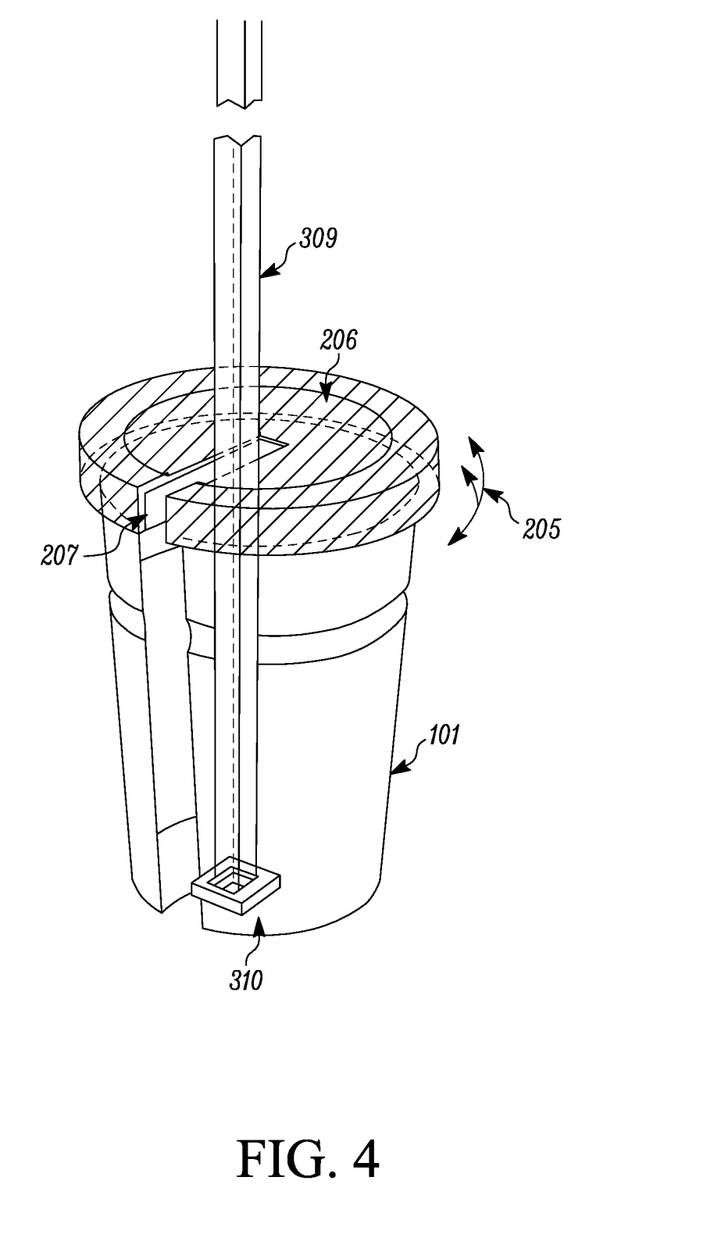
FIG. 4 illustrates the device and lid of FIGS. 1-2 configured around a structural element for securing the structural element.

FIG. 4 illustrates the device and lid of FIGS. 1-2 configured around a structural element for securing the structural element. In FIG. 4, the lid top indentation 206, the lid indentation slot 207, and the device 101 are configured around and to secure the structural element 309, and with the bottom of the device 101 over the flange 310 of the structural element 309.

Figure 5:
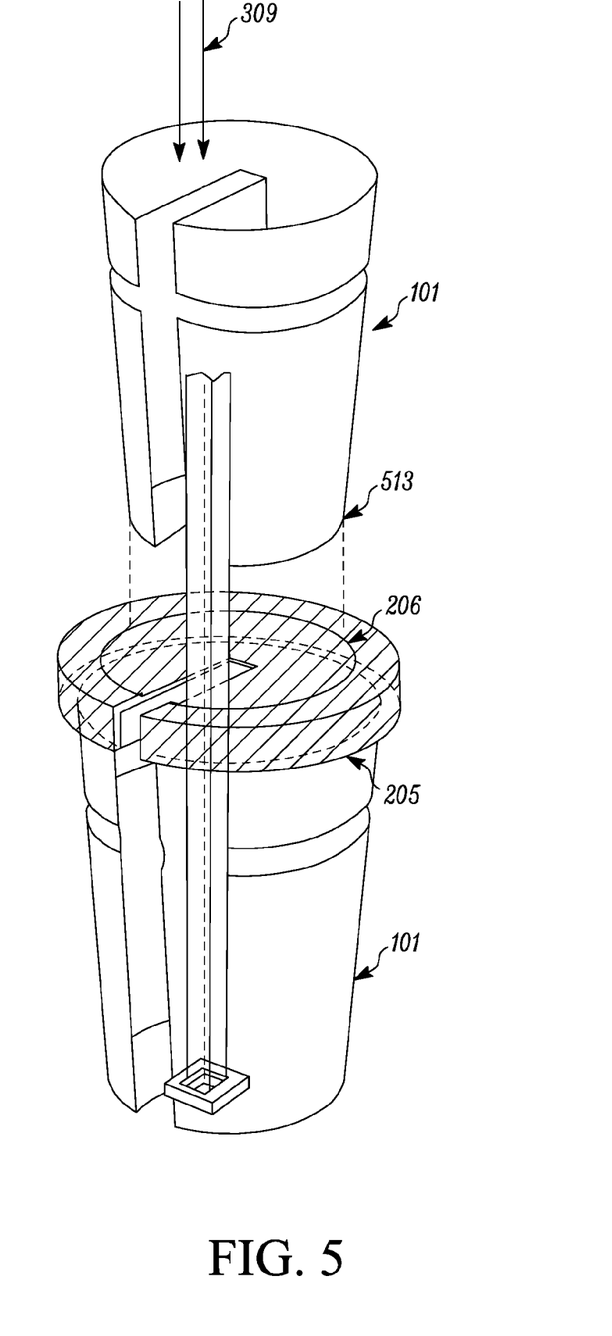
FIG. 5 illustrates a stackability of a device of FIG. 1 over a lid of FIG. 2 of another device of FIG. 1.

FIG. 5 illustrates a stackability of a device of FIG. 1 over a lid of FIG. 2 of another device of FIG. 1. In FIG. 5, the lid 205 with indent 206 is configured to accept a base 513 of the bottom another the device 101, advantageously, proving the stacking of a device 101 on a lid 205. This advantage allows for additional mass to be added to structural elements if desired. With such a stacking structure, the additional stacked and filled devices 101 add additional mass for holding down and securing structural elements 309

Although the present inventions are described in terms of employing bucket (e.g., 3 or 5 gallon buckets, etc.), barrels (e.g., 55 gallon barrels, etc.), and the like, based on the teachings of the present invention, the devices of the present invention can be adapted in size, shape, and the like, for securing any type of suitable structure having legs to be secured, and the like, as will be appreciated by those of ordinary skill in the relevant art(s).

Figure 6:
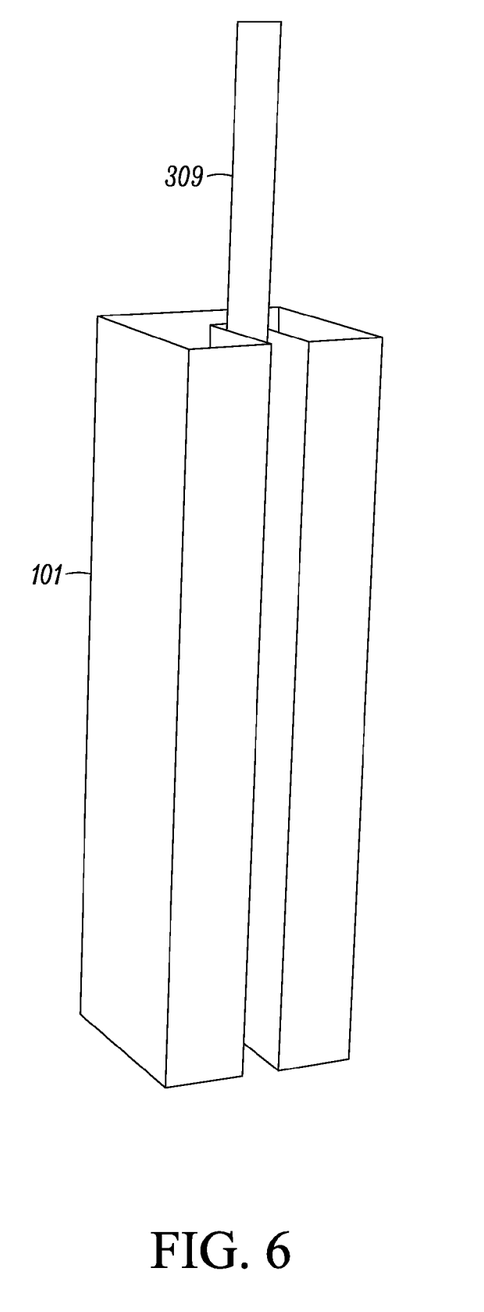
FIG. 6 illustrates a further embodiment of the device described with respect to FIGS. 1-5.

For example, FIG. 6 illustrates a further embodiment of the device described with respect to FIGS. 1-5. In FIG. 6, the device 101 is shown as rectangular shaped instead of round, and the structural element 309 can also be of any suitable; shape, such as round, rectangular shape, and the like, as needed. For example, additional embodiments of the device 101 can be configured to simulate roman columns, keystone block pillars, caricatures, symbols, and the like, wherein the device 101 is configured as a vessel with an indented slot allowing the device 101 to be placed equally around any suitable structural elements 309, and the like.

Accordingly, the teachings of the present invention can include suitable applications with respect to shape, size, contours, artistic expressions of design, suitable materials, and the like, that create a vessel with a slot indentation to the center point of the vessel along a structural object to secure the structural object therein.

Figure 7:
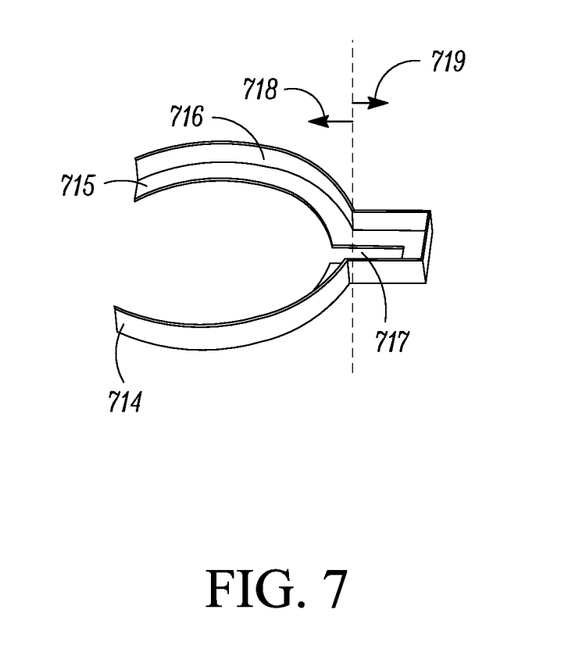
FIG. 7 Illustrates a device having a slot portion to fit around a structural element to be held in place, and a holding portion or platform adapted to hold a bucket, and the like, having weight to hold the structural element in place.

FIG. 7 illustrates a variation of a hold down device adapted to fit around, for example, legs, and the like, of a temporary structure, and the like, to secure such structure in place. In FIG. 7, the device 714 provides another novel method of adding mass to the legs of a structure. The device 714 is a connecting device to join a structural element with any other means of mass weight to secure it and provide weight. For example, the device 714 is structured to easily accept the dimensions of, for example, a common bucket, and the like, and secure it in place, at which time the container can be loaded with mass weight, such as water, rocks, sand, and the like. The device 714 can include a container accepting tray element 718; and a vertical structural securing element 719. The element 718 can include a widened bottom circular or semi-circular bottom 715, for example, of adequate width to rest weighted objects, such as a common bucket, and the like, thereupon. The element 715 has a vertical projection 716 that is formed upwards and on an outer edge thereof and that provides suitable structural support so as to hold the weighted object from horizontal movement off of element 715. Element 715 includes a widened bottom portion configured to rest upon base of a structural element 821; shown in FIG. 8, and a vertical projection continuation of element 716 on an outer edge thereof, and an open slot 717, configured for the size to the leg of the structure so as to hold down.

Figure 8:
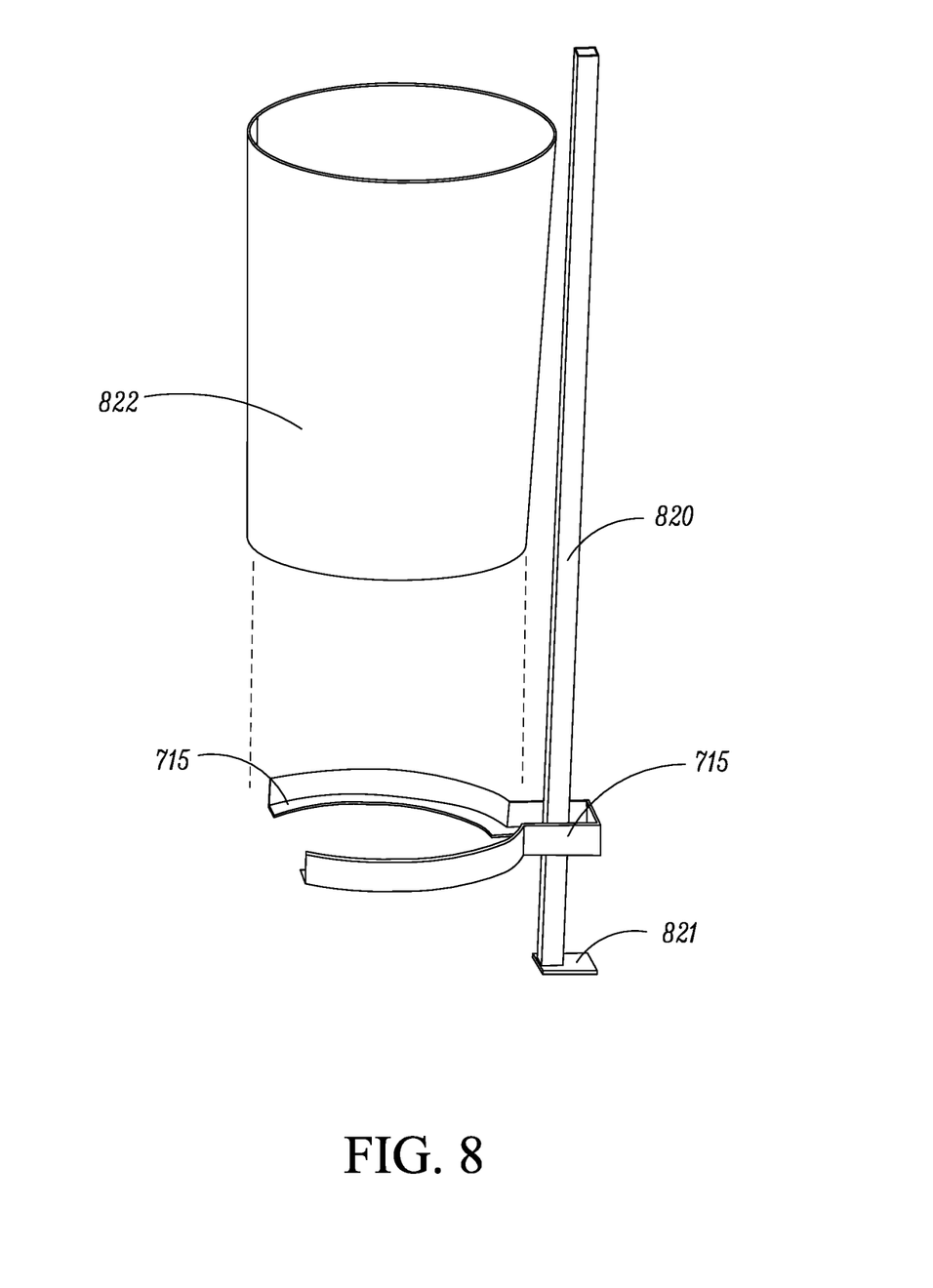
FIG. 8 illustrates the device of FIG. 7 employed with a structural element, and holding a bucket, and the like, having weight to hold the structural element in place.

FIG. 8 Illustrates the integral use of the slot tray 714 of FIG. 7, and employing a structural element 820, and a common bucket 822, and the like. The bucket 822 sits down within element 716 onto element 715 providing mass weight to the container accepting tray element 718. The mass weight can be of any suitable shape, solid or flexible, or liquid, or singular or multiple elements. The element 718 then transfers the total mass weight tangentially to the vertical structural securing element 719 that sits upon the base of the structural element 821.

Although the present inventions are described in terms of being employed for securing the legs of temporary structures, such as open tents, shade structures, signs, and the like, the teachings of the present invention can be adapted in size, shape, and the like, for securing any type of suitable structure having legs to be secured, and the like, as will be appreciated by those of ordinary skill in the relevant art(s).

While the present inventions have been described in connection with a number of illustrative embodiments, and implementations, the present inventions are not so limited, but rather cover various modifications, and equivalent arrangements, which fall within the purview of the appended claims.

What is claimed is:

1. A device for securing a structural object, the device comprising:
   a container having an open top portion and a closed bottom portion;
   a bottom tray having an opening portion, and a bottom wall configured to support thereon the container, the bottom tray having a short vertical wall relative to a height of the container attached to the bottom wall, and configured to support the container around a part of the circumference thereof,
   wherein the opening portion of the bottom tray has a central axis that is concentric with a central axis of the container, and an aperture defined by the bottom and vertical walls corresponding to the part of the circumference of the container;
   a pole shaped structural object having a base; and
   a slot having an opening portion integrated into an end of the bottom tray and the bottom and vertical walls, and configured to fit around the pole shaped structural object received within the opening portion of the slot, a bottom wall of the slot is continuous with the bottom wall of the tray and configured to rest upon a top of the base of the pole shaped structural object; and
   wherein the opening portion of the slot has a central axis that is concentric with a central axis of the pole, and an aperture defined by the opening portion of the slot corresponding to a part of the circumference of the pole shaped structural object; and
   wherein the central axis of the opening portion of bottom tray, and the central axis of the opening portion of the slot are adjacent to each other such that the vertical wall of the bottom tray is configured to support the container so that container is adjacent to the pole shaped structural object, and such that the opening portion of the slot and the opening portion of the bottom tray face a same direction.

2. The device of claim 1, wherein the bottom tray is cylindrical or rectangular shaped.

3. The device of claim 1, wherein the slot is rectangular, circular or wedge shaped.

4. The device of claim 1, wherein the structural object includes a leg of a shade structure, tent or sign.

* * * * *